No. 773,951. PATENTED NOV. 1, 1904.
A. MacGREGOR & J. V. B. KENNY.
REVERSIBLE FRICTION DRIVE GEAR.
APPLICATION FILED OCT. 3, 1903.
NO MODEL.
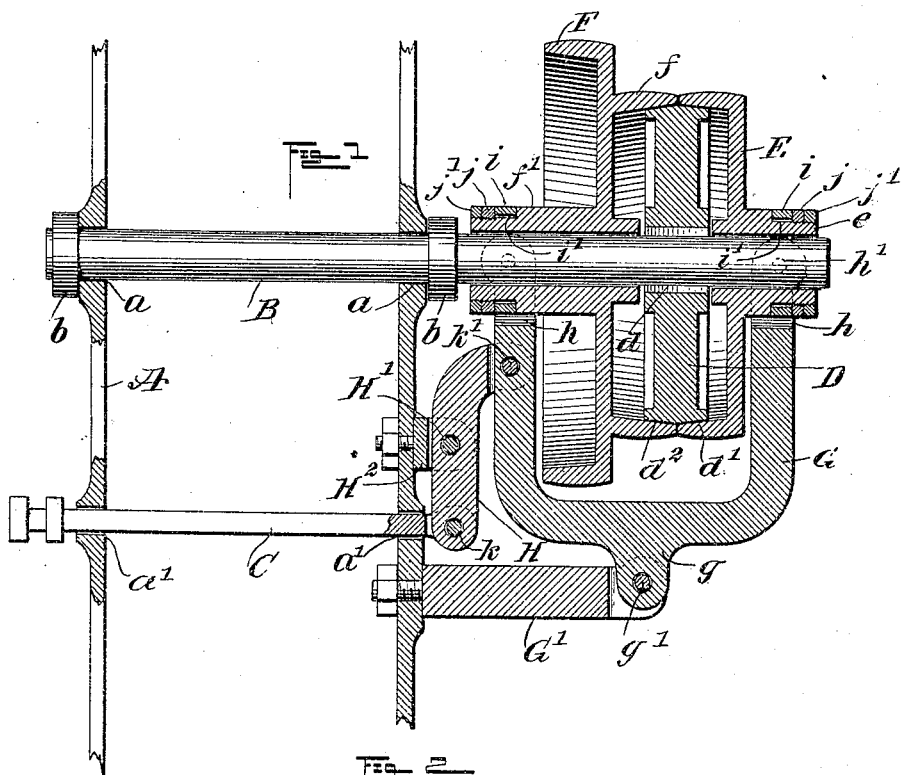
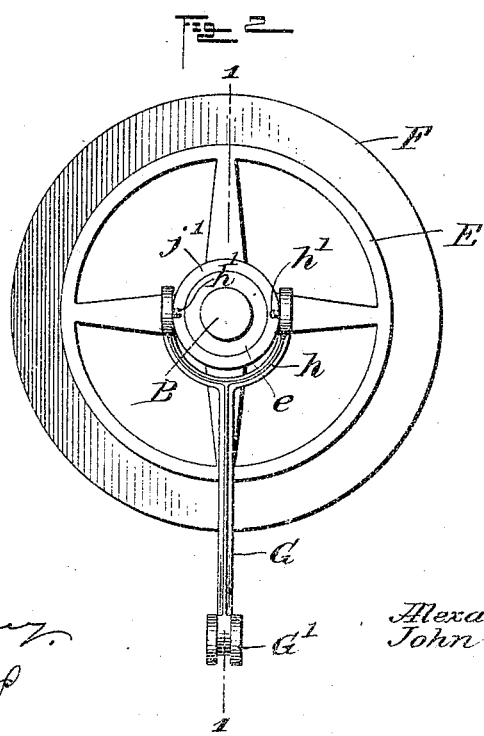
WITNESSES:
INVENTORS
Alexander MacGregor
John V. B. Kenny
BY
ATTORNEYS No. 773,951. Patented November 1, 1904.

UNITED STATES PATENT OFFICE.

ALEXANDER MacGREGOR, OF ELIZABETH, AND JOHN V. B. KENNY, OF BAYONNE, NEW JERSEY.

REVERSIBLE FRICTION DRIVE-GEAR.

SPECIFICATION forming part of Letters Patent No. 773,951, dated November 1, 1904.

Application filed October 3, 1903. Serial No. 175,592. (No model.)

*To all whom it may concern:*

Be it known that we, ALEXANDER MAC-GREGOR, a resident of Elizabeth, in the county of Union, and JOHN V. B. KENNY, a resident of Bayonne, in the county of Hudson, State of New Jersey, citizens of the United States, have invented a new and Improved Reversible Friction Drive-Gear, of which the following is a full, clear, and exact description.

Our invention relates to improvements in reversible friction drive-gears designed for use in connection with metal-working machines, although it may be used on any kind of machine wherein it is desirable to frequently change the direction of rotation of a shaft or other part to be driven.

The object that we have in view is the provision of a simple and substantial construction of drive-gear which is durable and efficient in service by the omission of weak parts that are liable to soon wear out by the frequent adjustment of the parts required to reverse the driven shaft. In our construction the several members are so combined and organized that a very slight movement of the pulleys relative to one another is all that is required to start, stop, or reverse the shaft, and said operation can be effected without jar or shock on the working parts.

Further objects and advantages of the invention will appear in the course of the subjoined description, and the actual scope thereof will be defined by the annexed claims.

Reference is to be had to the accompanying drawings, forming a part of this specification, in which similar characters of reference indicate corresponding parts in both the figures.

Figure 1 is a sectional elevation of a friction drive-gear constructed in accordance with our invention, the plane of the section being indicated by the dotted line 1 1 of Fig. 2; and Fig. 2 is an elevation looking at the right-hand side of Fig. 1.

A designates a portion of a machine-frame, the same being provided with journal-bearings $a$ for the accommodation of a main shaft B. In the frame A are other bearings, $a'$, which support an endwise-movable shipper-rod C, the latter being adapted for operation in any convenient or usual way from or by a part of the machine which is driven from the shaft B. As shown by Fig. 1, the shipper-rod C is below and parallel to the main shaft B; but the relation of the parts is not material. The shaft B is held from endwise movement in its bearings of the frame A by suitable collars $b$, and an end portion of this shaft B is prolonged or extended beyond one side of the frame. (See Fig. 1.)

D indicates the driven pulley, the hub of which is fastened firmly to the main shaft B by a key $d$ or any equivalent fastening. This pulley D is provided on its peripheral face with reversely-inclined bevels $d'$ $d^2$, and with the bevel face $d'$ is adapted to engage the inner surface of one driving-pulley, E. The other driving-pulley, F, is provided with a laterally-extending circular flange $f$, which is presented for engagement with the other beveled surface, $d^2$, of the driven pulley D. The pulleys E F are disposed on opposite sides of the pulley D, and said pulleys E F are adapted to be driven in opposite directions by suitable belts. (Not shown.) Said pulleys E F are provided with hubs $e$ $f'$, respectively, which are fitted loosely on the extended portion of the main shaft B, whereby the pulley D is fast with said shaft, whereas the pulleys E F are mounted loosely on the shaft to rotate independently thereof.

The loose driving-pulleys occupy a very compact relation to the driven pulley D, so that a very slight movement is required to free one pulley from the pulley D and to bring the other pulley into engagement with said pulley D, and in this invention we have provided a simple and substantial embodiment of means whereby the two loose driving-pulleys may be simultaneously adjusted to bring them into and out of engagement with the driven pulley D. As shown by the drawings, the adjusting means is embodied in the form of a yoke or jaw G, the same being provided with a depending lug $g$, which is mounted loosely on a pin or stud $g'$, that is supported in a bracket G', fastened to a part of the frame A. The arms of the yoke or jaw G are bifurcated, as at $h$ in Fig. 2, so as to embrace the hubs $e$ $f'$ of the loose pulleys E F, and said arms of the yoke are connected individually and pivotally to said hubs of the loose pulleys. The bifurcated end $h$ of each arm of the yoke supports inwardly-extending pivots $h'$, which are engaged with a suitable collar $i$ on the hub of each pulley, said collar being fitted in a reduced or recessed portion $i'$ of the pulley-hub and held from movement in one direction by a nut $j$, which in turn is engaged by a locknut $j'$, as clearly shown by Fig. 1.

The yoke or jaw is capable of a rocking or swinging movement on the axis afforded by the stud or pin $g'$, and the arms of this yoke are operatively connected with the loose driving-pulleys, so as to simultaneously shift them in the same direction, whereby a movement of the yoke toward the right in Fig. 1 will disengage the pulley E from and bring the pulley F into engagement with the working surface of the pulley D, whereas a movement of the yoke toward the left in Fig. 1 will make the pulley E engage frictionally with said pulley D and at the same time throw the pulley F out of engagement with the said pulley D.

The yoke is actuated from the shipper-rod C by any suitable form of connection, the same being shown in the drawings as a lever H. This lever is fulcrumed by a pin or bolt $H'$ to a short bracket $H^2$, which is fastened to the frame A. One end of the lever H has pivotal connection at $k$ with an end portion of the shipper-rod C, while the other end of said lever is connected pivotally at $k'$ to one arm of the yoke G, whereby the shipper-rod C when moved endwise is adapted to impart a rocking or oscillating motion to the yoke G, which in turn adjusts the two loose driving-pulleys in the desired manner.

It is evident that the yoke G may be moved to a position wherein both driving-pulleys E F are free from engagement with the beveled active surfaces $d'$ $d^2$ of the driven pulley D, thus allowing said pulley and the shaft B to remain at rest; but when the yoke is shifted toward the right the pulley F operates to drive the pulley D and shaft B, whereas a movement of the yoke G to the left brings the pulley E into engagement with the pulley D, thereby driving the shaft B in an opposite direction.

Having thus described our invention, we claim as new and desire to secure by Letters Patent—

1. A reversible friction drive-gear having a main shaft, a driven pulley fixed to said shaft and having reversely-inclined bevels, a driving-pulley loosely mounted on each side of the driven pulley and adapted to engage the bevels thereof, a pivoted U-shaped yoke having its members loosely connected with the hubs of the driving-pulleys, a lever pivotally connected with the yoke, and a shipper-rod connected with the lever.

2. A reversible friction drive-gear having a main shaft, a driven pulley fixed to said shaft, driving-pulleys loosely mounted on the shaft and disposed in coöperative relation to said driven pulley, a pivoted yoke having loose pivotal connection with the hubs of both driving-pulleys, a sliding shipper-rod, and a pivoted lever having one end connected with the shipper-rod and the other end with one member of the yoke.

3. A friction driving-gear having a main shaft, a driven pulley fixed to the shaft and having reversely-inclined bevels on its periphery, a driving-pulley loosely mounted on the shaft on one side of the driven pulley and adapted to engage with its inner surface one of the bevels of the said driven pulley, a second driving-pulley arranged on the other side of the driven pulley and provided with a lateral circular flange adapted to engage with its inner surface the other bevel of the driven pulley, a pivoted yoke having its members pivotally connected with the hubs of the driving-pulleys, a lever pivoted, between its ends, and having one end pivoted to one member of the yoke, and a shipper-rod pivoted to the other end of said lever.

In testimony whereof we have signed our names to this specification in the presence of two subscribing witnesses.

ALEXANDER MacGREGOR.
JOHN V. B. KENNY.

Witnesses:
   THOMAS A. CLARKE,
   WM. B. MARTIN